Figure 1:
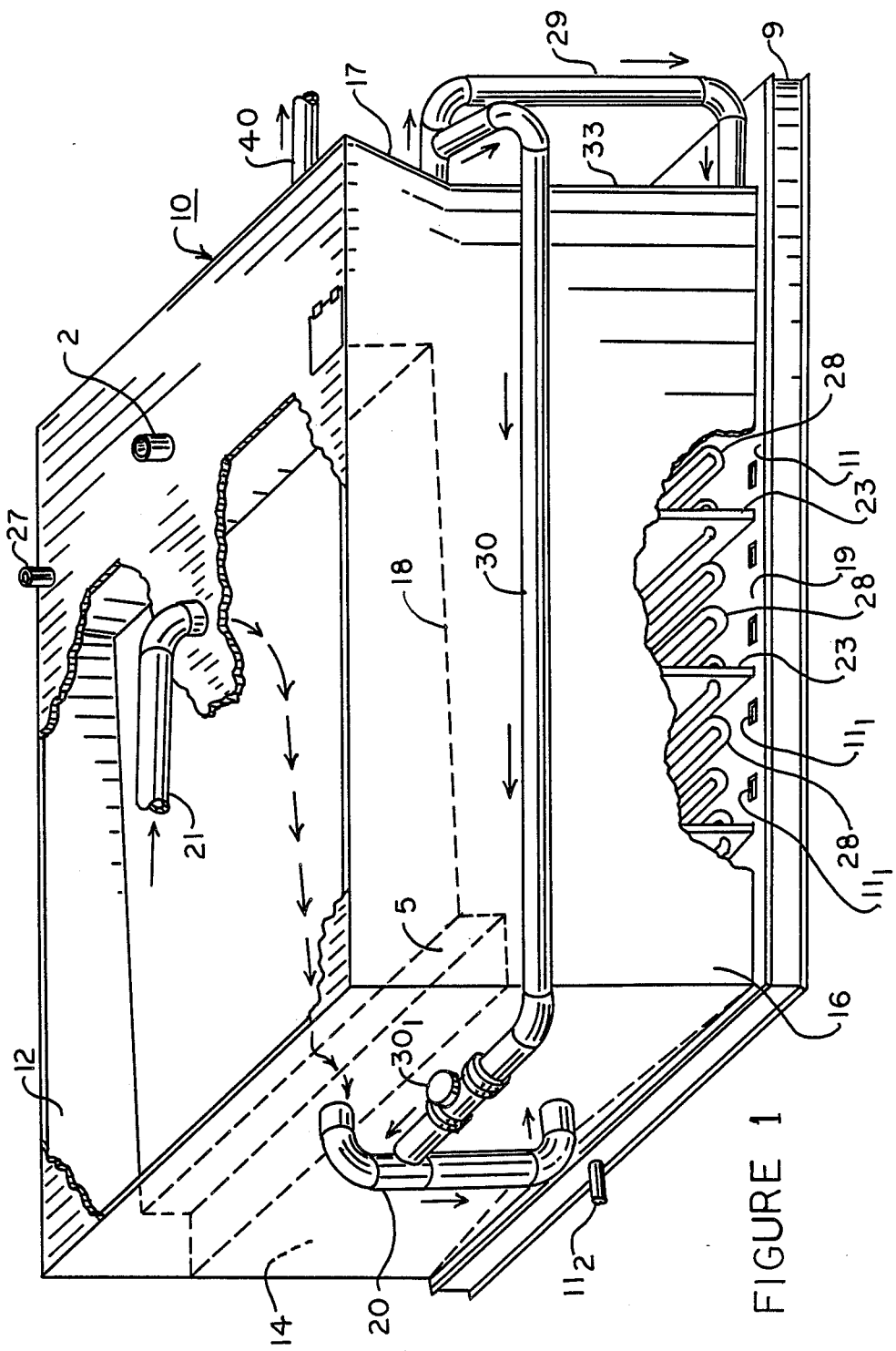

United States Patent [19]

Srinivasan et al.

[11] Patent Number: 4,885,094

[45] Date of Patent: Dec. 5, 1989

[54] ANAEROBIC DIGESTION PROCESS, AND FORCED FED FAST RATE DIGESTER

[75] Inventors: Vadake R. Srinivasan, Baton Rouge; Wilbur Monceaux, Youngsville, both of La.

[73] Assignee: Micro Pure Systems, Inc., Lafayette, La.

[21] Appl. No.: 165,977

[22] Filed: Mar. 9, 1988

[51] Int. Cl.$^4$ .............................................. C02F 3/28
[52] U.S. Cl. .................................. 210/610; 210/612; 210/631
[58] Field of Search ............... 210/601, 605, 610, 612, 210/613, 614, 630, 631

[56] References Cited

U.S. PATENT DOCUMENTS

| | | | |
|---|---|---|---|
| 2,974,800 | 3/1961 | Fleischmann | 210/612 |
| 3,622,507 | 11/1971 | Pasveer | 210/625 |
| 3,915,853 | 10/1975 | Luck | 210/612 |
| 3,926,795 | 12/1975 | Saldick | 210/605 |
| 4,246,099 | 1/1981 | Gould et al. | 210/613 |
| 4,297,216 | 10/1981 | Ishida et al. | 210/613 |
| 4,311,593 | 1/1982 | Benjes et al. | 210/610 |

FOREIGN PATENT DOCUMENTS

| | | |
|---|---|---|
| 2518078 | 6/1983 | France . |
| 142177 | 6/1980 | German Democratic Rep. . |
| 88/04282 | 6/1988 | PCT Int'l Appl. . |

Primary Examiner—Peter Hruskoci
Assistant Examiner—Christopher Upton
Attorney, Agent, or Firm—Llewellyn A. Proctor

[57] ABSTRACT

An anaerobic process for the digestion of organic wastes, and novel anaerobic digester. In digestion of the organic wastes in the presence of anaerobic microorganisms, at anaerobic conditions, the carbon:nitrogen and nitrogen:phosphorus ratios of the digestion are adjusted to optimize the rate of anaerobic digestion, generally only about 12 to 72 hours, or less, being required to produce a stabilized low solids sludge and clean liquid effluent. The anaerobic digester is designed to facilitate this process, and is transportable from site to site.

6 Claims, 2 Drawing Sheets

ANAEROBIC DIGESTION PROCESS, AND FORCED FED FAST RATE DIGESTER

FIELD OF THE INVENTION

This invention relates generally to an anaerobic digester, and to the anaerobic digestion of organic wastes. In particular, it relates to apparatus and process for the anaerobic digestion of organic wastes at conditions wherein the carbon and nitrogen, or carbon, nitrogen, and phosphorus ratios of the waste are adjusted to optimize the rate of anaerobic digestion. More particularly, it relates to a transportable fast rate anaerobic digester.

BACKGROUND AND PROBLEMS

Various methods are known for the processing and clean up of organic wastes, solids, semi-solids and liquids, to produce non-hazardous products for release to the environment. These include the known techniques of fermentation which includes both aerobic and anaerobic digestion processes, and processes which employ steps encompassing both aerobic and anaerobic digestion. The objective of both is to reduce, as well as to efficiently and effectively stabilize sludge solids, and produce clean effluents for discharge to the environment, e.g., to a natural stream. Anaerobic digestion generally offers advantages over aerobic digestion in that methane is produced, the methane being suitable as a fuel gas which can be used internally to supply process heat, as well as provide process credits for external use. Anaerobic digestion of organic wastes also generally produces less sludge than aerobic digestion. This is because the aerobic microorganisms' waste is about 85 percent of what is consumed by the microorganisms. On the other hand, however, anaerobic processes generally require longer periods of time for the effective clean up and stabilization of solids, and the production of clean effluents. Generally from about 20 to 30 days of anaerobic fermentation is required at ambient temperatures, as commonly practiced, to produce a reasonably stable form of solids, and effluent suitable for direct discharge to the environment. By warming the fermentation mixture this period has been reduced, ideally to about 12 to 20 days. (Reference is made to Union Carbide's U.S. Pat. No. 4,246,099 which issued to Gould et al on Jan. 20, 1981. This reference provides a historical perspective on anaerobic and aerobic digestion).

Anaerobic digesters are constituted generally as closed or domed vessels within which very large charges of organic waste are maintained, and fermented in batch. Anaerobic digestion of the waste produces methane gas and generally, after about 20–30 days, the liquid and suspended solids component are withdrawn into a separator and separated into liquid and slurry components. The slurry component is generally sufficiently stabilized that it is suitable as a land fill, and the liquid sufficiently clean for discharge to a natural stream. Whereas anaerobic digesters have proven useful for handling large volumes of municipal and industrial wastes, the time required for digestion of the organic waste is entirely too long. Consequently, most often aerobic digesters are employed in handling large volumes of municipal and industrial wastes. Both aerobic and anaerobic digesters however are unsuitable for handling small volumes of organic wastes. There is today a pressing need for improved processes, and digesters capable of processing small volumes of organic wastes over shorter periods of time. Albeit anaerobic processes, and digesters, offer certain advantages, the time period required for adequate effective fermentation militates against their use.

OBJECTS

It is nonetheless a primary objective of the present invention to provide an anaerobic process, and anaerobic digester, admirably suitable for the rapid efficient digestion of organic wastes.

A particular object is to provide an anaerobic process, and anaerobic digester suitable for handling organic wastes on relatively small scale.

A specific object is to provide an anaerobic digester which can be conveniently transported from one site of organic waste to another, and utilized for the rapid clean up of such sites.

THE INVENTION

These objects and others are achieved in accordance with this invention which embodies an anaerobic process, and anaerobic digester for the anaerobic digestion of carbon, nitrogen and phosphorus containing organic wastes in the presence of anaerobic microorganisms at anaerobic conditions by adjustment of the carbon:nirogen ratio, preferably the carbon:nitrogen and nitrogen:phosphorus ratios, to accelerate or speed up the rate of digestion of the organic waste. Whereas in conventional anareobic fermentation the time required for stabilization of the slurry and the production of a clean liquid effluent has ranged, at best, from about 12 to 20 days, supra, anaerobic fermentation to achieve a stabilized slurry and clean liquid in accordance with this invention can be performed in about 12 to 72 hours. The anaerobic fermentation can be conducted at this high rate in a small anaerobic digester which can be conveniently transported from one waste site to another, and hence is particularly useful in the clean up of industrial waste sites, and spills, after which time the digester can then be transported to another site.

Organic wastes processable in accordance with this invention include industrial and municipal waste water, sewage, wastes from industrial spill sites, dump sites, and the like. Pretreatment of the organic waste may be desirable, or necessary in some instances where there is a high content of solid organic material of cellular origin to produce a stream constituted principally of a liquid contaiining soluble organic material [BOD/COD], and an organic solids slurry. In other cases pretreatment of the organic wastes is not necessasry. In general, it will not be necessary to pretreat a low solids sludge or sludge which contains no more than about 100 mg/l to about 2000 mg/l COD, (chemical oxygen demand), preferably from about 100 mg/l to about 500 mg/L COD. High solids sludges, or sludges containing greater than about 2000 mg/L COD, particularly from about 2000 mg/L to about 5000 mg/L COD must be pretreated. In any event, at least occasionally it may be desirable to pretreat or process an organic sludge, particularly one produced aerobically, to partially solubilize the sludge solids component prior to initiation of the anaerobic digestion step. Pretreatment may thus require pretreating said organic sludge with an alkali, or alkaline solution, heating same, and digesting the organic sludge to produce a stream constituted principally of an aqueous solution, or aqueous solution and volatile solid slurry. In pretreating an organic sludge, the sludge is first admixed with an alkali, or alkaline solution; the alkali or alkaline solution being added to the organic sludge, or the organic sludge being added to the alkali, or alkaline solution. In general, an alkaline solution, e.g., a 0.1N NaOH solution of NaOH in water, is added to the organic sludge, suitably in concentration and amount sufficient to raise the pH of the organic sludge to from about 8 to about 12, preferably from about 9 to about 10. The sludge, at pH within these ranges, is heated to a temperature ranging from about 75° C. to about 125° C., preferably from abot 90° C. to about 100° C. to decompose or break down the cells of the microorganisms contained therein and form a slurry which is more susceptable to microbial digestion. Generally, this temperature is maintained over a period of time ranging from about 0.1 hour to about 1 hour, preferably from about 0.1 hour to about 0.25 hour, which is generally adequate to destroy most of the cells and form the stabilized sludge component. The suspension is then adjusted to a temperature ranging between about 30° C. and 50° C., preferably from about 35° C. to about 40° C. The cellular components of the sludge, treated at these conditions, are generally essentially destroyed.

In initiating the anaerobic digestion step per se, either from an aqueous solution or aqueous solution and volatile solids slurry, whether or not obtained from a pretreated organic sludge, the temperature of the aqueous solution or aqueous solution and volatile solids slurry—hereinafter fermentation broth—, is adjusted to from about 30° C. and 50° C., preferably from about 35° C. to about 40° C., the pH adjusted to from about 6.5 to about 8, preferably from about 7 to abaout 7.5, and an anaerobic mircroorganism, or mixture of anaerobic microorganisms, added to the fermentation broth. Suitably, a mixture of anaerobic microorganisms, or anaerobes, obtained from an an anerobic lagoon, after cultivation, is added to the fermentation broth, or directly fed into the anaerobic digester. Adjustment of the carbon:nitrogen ratito, as well as the nitrogen:phosphorus ratio, accelerates the rate of fermentation of the broth and is a key and novel feature of the process.

In conducting the fermentation reaction, the carbon:nitrogen ratio is adjusted within a range of from about 5:1 to about 10:1, preferably from about 7:1 to about 9:1, and the nitrogen:phosphorus ratio within a range of from about 3:1 to about 8:1, preferably from about 4:1 to about 7:1, and these ratios are maintained throughout the fermentation to produce a low solids stabilized component, and a clean liquids effluent.

In adjusting the carbon:nitrogen ratio of the broth, it is generally always necessary to add a carbonaceous compound to provide an energy source for growth of the anaerobic microorganisms which feed also on the organic waste matter. Organic wastes, e.g., municipal wastes, are thus invariably quite low in carbon, but contain considerable amounts of nitrogen or phosphorus or both. Such wastes require little adjustment of the nitrogen and phosphorus levels per se. Suitably, a waste sugar or sugar-containing product, e.g., glucose or sucrose, from a source such as blackstrap molasses, raw sugar, or a crude product from the beet or cane processing, can be used as a source of carbon. Exemplary of compounds which can be employed as a source of nitrogen are, e.g., ammonia, ammonium hyroxide, salts or nitrate such as ammonium nitrate, sodium nitrate, and the like. Examplary of phosphorus sources are, e.g., ammonium phosphate, sodium phosphate, bone char, and the like. In carrying out the fermentation, analysis is made of the broth to determine the amount of carbon, nitrogen and phosphorus, respectively, already present in the broth, if any, and the amount of carbon, nitrogen and phosphorus, respectively, required to provide the desired carbon:nitrogen and nitrogen:phosphorus ratios. Compounds containing these elements are then added to the broth. Generally, this is done by intermittent addition of the carbon, nitrogen and phosphorus containing compounds at frequent intervals, but preferably continuously to provide a continuous operation. Generally, it is required to increase the concentration of carbon within the admixture from about 2 to about 4 times, e.g., sucrose or glucose being continuously added to increase the concentration of carbon normally found within such an admixture. Nitrogen and phosphorus can be added continuously, or intermittently at frequent intervals as needed to maintain the required carbon:nitrogen and nitrogen:phosphorus ratios. The residence time of the admixture within the anaerobic digester can range up to about 72 hours, but satisfactory clean up and stabilization of the broth can often be accomplished within 12 hours. Generally from about 12 hours to about 72 hours residence time is required to satisfactorily clean up and stabilize the admixture.

In accordance with the process of this invention, the biological clean up with anaerobic microorganisms at anaerobic conditions of the waste is made in effect a fermentation process by continuous adjustment of the carbon:nitrogen and nitrogen:phosphorus ratios which, at the pH and temperature ranges specified, maximize the density and biological activity of the anaerobic bacteria to produce a very fast rate of reaction. The process produces only a small amount of sludge, as contrasted with the more conventional systems. Generally, from about 80 percent to about 96 percent of the total volume of solids will be digested within 24 hours. Generlly 80 percent of the total solids are digested in the reactor on a first pass basis, and by recycling the sludge on a continuous basis another 80 percent of the remaining 20 percent of the sludge can be digested. Generally, no more than 4 percent of the sludge will have to be hauled away, or burned.

The process of this invention not only solves one of the major problems of sewage treatment, viz. sludge disposal, but the anaerobic digestion converts the solids to a methane rich gas at the ratio of 60 percent methane, 40 percent $CO_2$.

A preferred anaerobic digester of small size useful as a sludge digester per se, or sludge digester as an add on to existing systems is hereinafter described. It is thus useful per se, e.g., as a system for handling industrial waste, where high concentrations of solids must be broken down prior to discharge to sewage systems. Alternatively, e.g., it can be used in rural areas as a small unit for individual housing, in subdivisions outside city sewage hook ups, or for offshore production platforms.

Figure 2:
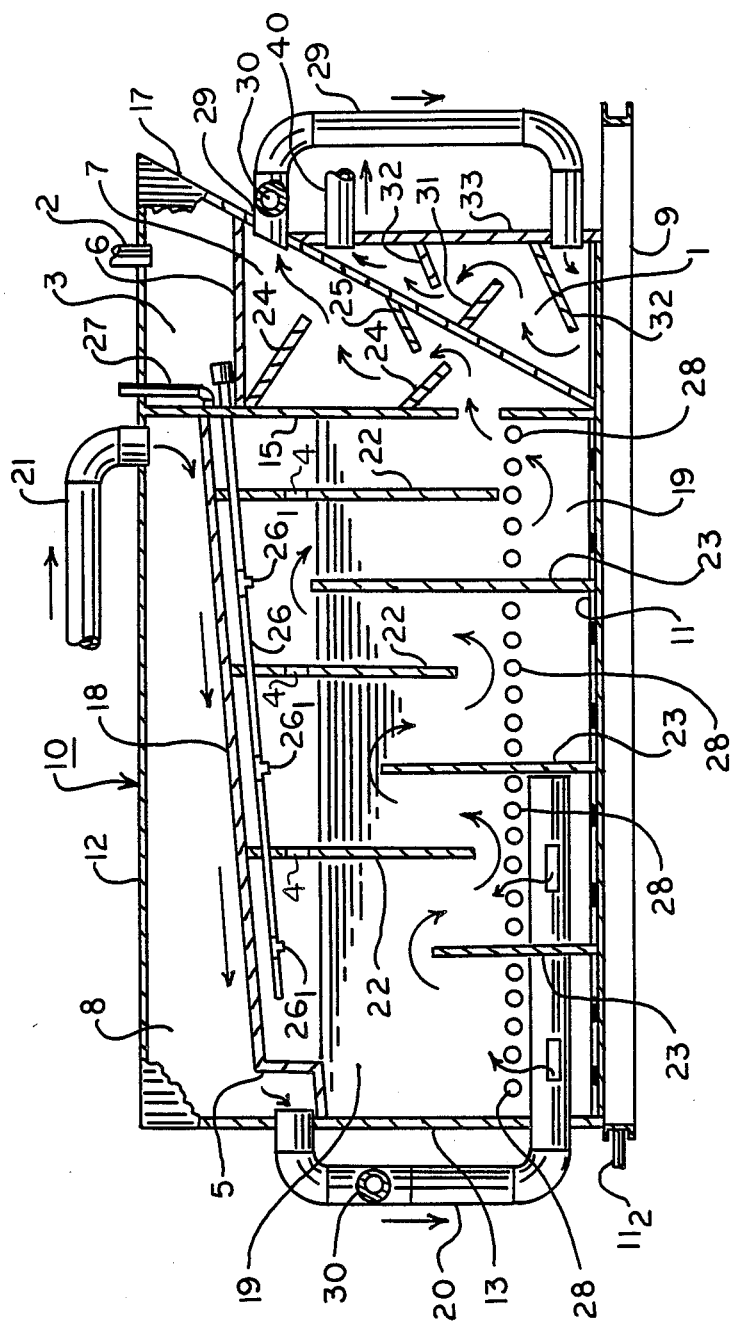

A preferred readily transportable anaerobic digester is shown in the following drawing, to which reference is made in describing its operation, in which:

FIG. 1 is an isometric view, in partial section, of said anaerobic digester; and FIG. 2 is a side elevation view of the anaerobic digester depicted in FIG. 1.

Referring to the figures, the anaerobic digester 10 is constituted generally to a compartmented vessel having an enclosing floor or bottom wall 11, top wall 12 and side walls 13, 14, 15, 16. An adjoining forward compartment 7 located between forward walls 15, 17 and another compartment 1 between walls 17, 33, provide settling tanks. Liquid from compartment 19 enters into the lower side of compartment 7 via bottom openings within wall 15. Compartment 7 is in liquid communication with Compartment 1 via outlet 29. The vessel is mounted upon skid beams 9 for ease of transport.

The upper side of the vessel is provided with a compartment 8 formed by a partitioning inner wall 18 which extends, slightly diagonally, from a trough 5 affixed upon the back side wall 13 to an inner, front side wall 15. Below the partitioning inner wall 18, which slopes downwardly from its front side to its rearward side, lies a lower compartment 19, compartments 8, 19 being communicated one with the other by means of a conduit 20. The upper compartment, or chamber 8, is provided with an inlet 21. Organic waste charged to the inlet 21 pours downwardly and rearwardly along the sloping inner wall 18 to the trough 5. An outlet from the trough 5 to the lower chamber 19 is provided by the conduit 20. The lower compartment 19 is provided with a plurality of vertically oriented alternately placed top and bottom mounted baffles 22, 23; the top mounted baffles 22 being attached via an upper edge to the partitioning inner wall 18 and extending downwardly, while the bottom mounted baffles 23 are attached via a lower edge to the bottom wall 11 of the vessel and extend upwardly to provide a circuitous flow path across the top edges of the bottom mounted baffles 23 and bottom edges of the top mounted baffles 22. The unattached edges of baffles 22, it will be observed, extend vertically downwardly below the unattached edges of baffles 23 providing separated compartments through which liquid organic waste can be passed. Slots 4 are provided in the top of baffles 22 to allow the flow of gas from one compartment to another. The gas will collect on the under side of partitioning inner wall 18 and flow upwardly to a gas outlet 27. The vertically oriented front end inner wall 15 is provided with bottom slotted openings which lead into and provide a liquid inlet means into compartment 7 which provides a first settling tank for the organic waste. Compartment 7 is formed between said wall 15, front end wall 17, and a horizontally oriented inner wall 6 which extends across the wall 15 and wall 17. Baffles 24, 25 are also mounted on walls 15 and 17, respectively, between which a liquid flow path, continuous with that provided by baffles 22, 23, is provided. Compartment 1, a second settling tank of the series, is formed between walls 17, 33 and each of these walls too is provided with alternately disposed baffles 31, 32, respectively. Compartments 1, 7 are communicated one with the other via oulet 29 within the wall 17.

The upper portion of the lower compartment 19 is provided with a spray system 26, inclusive of nozzles $26_1$, through which a liquid can be introduced into said compartment 19. Spray system 26 is connected with compartment 3 which will house chemicals which can be fed into the sludge. A filler inlet 2 is also located at the top side of compartment 3 through which chemicals can also be introduced. A vent gas stack 27 connects the upper portion of the compartment 19 with the vessel exterior, and a continuous heating coil 28 is located within the lower portion of compartment 19 through which steam can be passed for heating liquid introduced into compartment 19. Liquid ascending through baffles 24, 25 to the top of compartment 7 flow into the mouth of conduit 29, a large portion of the liquid being returned via conduit 29 to the bottom of compartment 1, and another conduit 30, provided with a check valve $30_1$, extends to conduit 20 to reintroduce microorganisms into the starting phase of the process. The liquid introduced via conduit 29 into the bottom of compartment 1 ascends to the top of compartment 1 through the flow path provided by baffles 31, 32 affixed to walls 15, 33, respectively. A clean liquid effluent can be removed from the digester 10 via outlet 40.

Slots $11_1$ are located in the floor 11 of the digester 10. Sludge passed through slots $11_1$ can be collected upon a lower floor (not shown), and recycled if desired via the sludge drain $11_2$. Thus, beams can be sealed on the outside to form a drain pipe, slots cut over the drain pipe for collection of sludge, and the sludge so collected can be recycled.

In operation, with a full charge of the organic waste to be fermented, temperature, pH, the carbon:nitrogen and nitrogen:phosphorus ratios adjusted, and a mixture of anaerobic microorganisms taken, e.g., from an anaerobic fermentation lagoon, and cultivated is added to the anaerobic digester, and organic waste is continuously fed via inlet 21 into trough 5 within the upper compartment 8 of the digester. A solution containing the required amounts of sugar, as a source of carbon, in which nitrogen-containing and phosphorus-containing compounds is dissolved, to provide the desired carbon: nitrogen and nitrogn:phosphorus ratios is likewise fed continuously via spray system 26 and sprayed via nozzles $26_1$ into the upper portion of the lower compartment 19 of the digester. The organic waste, or fermentation broth, flows downwardly and rearwardly along the inclined inner wall 18, enters into and fills trough 5, and then flows into the conduit 20. From conduit 20, it is discharged via slotted openings within the conduit 20 between rearward side wall 13 and the most rearward bottom mounted baffle 23, and between baffle pairs 22, 23 into the bottom of the compartment 19; the broth flowing slowly over the top edges of baffles 23 and below the bottom edges of baffles 22. Air is essentially excluded from contact with the organic waste after introduction into the digester from tough 5. Nozzles $26_1$ of the spray system 26 provide a continuing spray of the solution containing the required amounts of carbon, nitrogen and phosphorus. Steam passing through coil 28 maintained in heat exchange relationship with the liquid broth, maintains the desired temperature throughout the operation. The steam can be generated from methane produced by the process.

The organic waste picks up a minimum amount of air on entry into the system. The openings within the conduit 20 through which the liquid organic waste is discharged into compartment 19, and the baffles are arranged to minimize the entrance of air into the system. The anaerobic digestion converts the organic solids components of the waste to a methane rich gas at the ratio of about 60 percent methane, and about 40 percent $CO_2$. The methane gas is vented from lower compartment 19 via line 27, and can be scrubbed by conventional means (not shown) to remove the odor from the gas.

The following is exemplary of the process, and apparatus, of this invention.

EXAMPLE

An anaerobic digester, as heretofore described, was employed to process over a period of four months a raw sewage obtained from a small municipality in Southern Louisiana. The carbon:nitrogen ratio of the sewage on introduction into the digester was adjusted to a ratio of 8:1, and maintained throughout the run at said ratio by the continuous addition thereto of a solution of cane sugar (sucrose). The nitrogen:phosphorus ratio was maintained at 5:1 throughout the run, there having been no necessity to add either nitrogen or phosphorus to the sewage. The temperature, pH, and fecal coliform bacteria count prior to chlorination, of both the influent and effluent during the test period are given as follows:

Temperature, °C.
    Influent: 35.6 (Range: 34–37)
    Effluent: 25.8 (Range: 24–28.5)
pH
    Influent: 6.54 (Range: 5.46–7.28)
    Effluent: 6.64 (Range: 6.48–6.82)
Fecal Coliform Bacteria
    Influent: 20,800 org/100 ml
    Effluent: (no chlorination) 1,400 org/100 ml The following gives the total suspended solids (TSS) and BOD (biological oxygen demand) of the influent and effluent at three different flow rates, expressed in term of digester capacity per 24 hour period.

| | 33% of capacity every 24 hours | | |
|---|---|---|---|
| (1.) Flow Rate: | TSS | BOD | Ammonia Nitrogen |
| Influent (mg/l) | 115 | 145 | 262 |
| | (94–126) | (110–172) | (25–27) |
| Effluent (mg/l) | 12 | 28 | 9.6 |
| | (10–14) | (26–30) | (9.2–10) |
| % Removal | 89.6% | 80.7% | 63.1% |

| | 50% of capacity every 24 hours | | |
|---|---|---|---|
| (2.) Flow Rate: | TSS | BOD | Ammonia Nitrogen |
| Influent (mg/l) | 125 | 113 | 28 |
| | (105–186) | (110–150) | (26–30) |
| Effluent (mg/l) | 11.3 | 24 | 12 |
| | (9–13) | (20–27) | (11–13) |
| % Removal | 91.0% | 82.0% | 57.1% |

| | 100% of capacity every 24 hours | | |
|---|---|---|---|
| (3.) Flow Rate: | TSS | BOD | Ammonia Nitrogen |
| Influent (mg/l) | 156 | 143 | 34 |
| | (132–165) | (130–160) | (30–36) |
| Effluent (mg/l) | 10.3 | 28 | 12 |
| | (9–12) | (20–27) | (11–13) |
| % Removal | 93.4% | 80.4% | 64.7% |

| Chlorination of Effluent: | BOD | Fecal Coliform Bacteria |
|---|---|---|
| Effluent Prior to Chlorination | 32 mg/l (30–34 mg/l) | 1400 org/100 ml (1200–1700 org/100 ml |
| Effluent After Chlorination | 5.5 mg/l (4–7 mg/l) | 100 org/100 ml (<1–20 org/100 ml) |

It is apparent that various modifications and changes can be made in the process and apparatus without departing the spirit and scope of the invention.

Having described the invention, what is claimed is:

1. A process for producing on a continuous basis from a municipal waste comprising carbon, nitrogen and phosphrous and with a carbon: nitrogen ratio of less than about 5: a stabilized low solids sludge and clean effluent suitable for discharge to the environment which comprises adjusting and maintaining the temperature of the waste within a range of from about 30° C. to about 50° C., the pH of the waste within a range of from about 6.5 to about 8, adding a sugar-containing carbon source to the waste to maintain the carbon:nitrogen ratio of the waste within a range of from about 5:1 to about 10:1, maintaining the nitrogen:phosphorus ratio of the waste within a range of from about 3:1 to about 8:1, and fermenting the organic waste in the presence of an anaerobic microorganism, or mixture of anaerobic microorganisms, at anaerobic conditions, while providing a residence time up to about 72 hours.

2. The process of claim 1 wherein the temperature ranges from about 35° C. to about 40° C., pH from about 7 to about 7.5, the carbon:nitrogen ratio ranges from about 7:1 to about 9:1, and the nitrogen:phosphorus ratio ranges from about 4:1 to about 7:1.

3. The process of claim 1 wherein, in a pretreatment step, a microorganism-containing organic waste is treated by admixture with an alkali, or alkaline solution sufficient to raise the pH of the sludge to from about 8 to about 12, and heating said waste to a temperature ranging from about 75° C. to about 125° C. sufficient to decompose and break down the cells of the microorganisms contained therein to form a stabilized sludge component, separating the stabilized sludge component from a predominantly carbon, nitrogen and phosphorus-containing liquid component, and then digesting said predominantly liquid component in the presence of an anaerobic microorganism, or admixture of anaerobic microorganisms, at said anaerobic conditions.

4. The process of claim 3 wherein in conducting the anaerobic digestion of the carbon, nitrogen and phosphorus-containing liquid component the temperature ranges from about 35° C. to about 40° C., pH from about 7 to about 7.5, the carbon:nitrogen ratio ranges from about 7:1 to about 9:1, and the nitrogen:phosphorus ratio ranges from about 4:1 to about 7:1.

5. The process of claim 3 wherein, in the pretreatment step, the microorganism-containing organic waste is maintained at pH ranging from about 9 to about 10, the temperature from about 90° C. to about 100° C., and said pretreatment is continued over a period of from about 0.1 hour to about 1 hour.

6. The process of claim 5 wherein said pretreatment is continued over a period of from about 0.1 hour to about 0.25 hour.

* * * * *